United States Patent Office 3,294,719
Patented Dec. 27, 1966

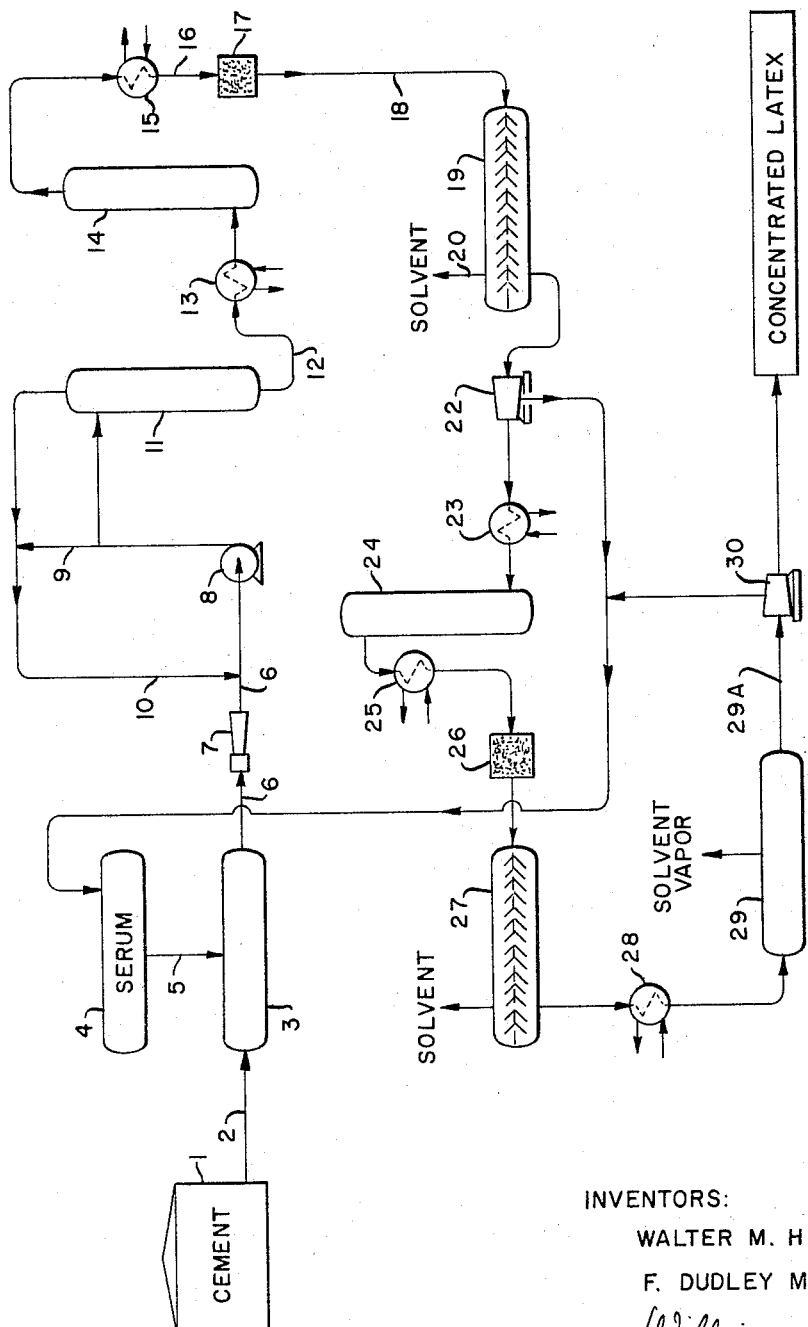

3,294,719
FOAMED AND DEFOAMED DIENE LATEX
Walter M. Halper, San Pedro, and Fred Dudley Moss, Long Beach, Calif., assignors to Shell Oil Company, New York, N.Y., a corporation of Delaware
Filed Dec. 10, 1962, Ser. No. 243,356
3 Claims. (Cl. 260—23.7)

This invention relates to an improved process for producing latices of elastomers. More particularly, it relates to an improved process for producing latices of elastomers from organic solvent solutions thereof.

Synthetic elastomers and other polymers are commonly prepared by emulsion polymerization techniques whereby the resulting product at the end of the polymerization is a suspension wherein the solid content varies depending upon the particular art and technology involved. Thus, for example, synthetic elastomers of the type represented by styrene-butadiene copolymers are suitably prepared by emulsion polymerization in the presence of water and emulsifying agents so that the resulting product is an aqueous suspension of the copolymer together with the unreacted monomers.

In such emulsion polymerization processes, the copolymer ultimately may be separated upon the addition of precipitants such as salt and acid, whereby a crumb of the rubber is obtained which is easily separated from the aqueous phase. Synthetic latex, as distinguished from crumb, is highly useful in the production of foam rubber or cellular product, as well as for the production of dip goods, such as rubber gloves and the like. The latex is usually obtained from the emulsion by flashing to remove the unreacted monomer and some water, the resulting product being latex.

One of the major difficulties encountered in the usual procedures lies in the preparation of latices having a controlled particle size. Such latices are required for high-grade foam production.

The desirable objectives include preparation of latices having a wide particle size distribution coupled with a relatively large particle size. This enables the preparation of latices of high solids content having acceptable viscosity characteristics, greater froth fluidity, less foam shrinkage, shorter gel times, improved film quality and lower non-rubber content, thus allowing greater compounding flexibility.

In recent years, synthetic elastomers produced by solution polymerization methods have received much attention, mainly due to advances and changes in elastomer technology. The problems of emulsifying the cement so produced to make latices therefrom have created difficulties not heretofore experienced. Material differences exist not only between the elastomers per se, but, in addition, the solutions of these elastomers have rheological properties and characteristics different from those of prior art products.

It would be highly desirable to devise a process for the conversion of synthetic elastomer cements into latex form without encountering the difficulties briefly referred to hereinbefore. It would be especially desirable to devise a process which would minimize the particle size distribution of the latex while still retaining the benefits of otherwise previously known latex-forming processes.

Now, in accordance with the present invention, a process for the production of a latex of a synthetic elastomer is provided which comprises mixing an aqueous dispersion of an emulsifying agent with an elastomer cement in which the solvent for the elastomer is no more than slightly soluble in water, subjecting the mixture so formed to emulsification, whereby an emulsion is formed containing a spectrum of particle sizes of cement as the internal phase of the emulsion, separating the "cream" from said emulsion, and thereafter removing the solvent from the remaining major portion of the emulsion to obtain a latex of elastomer particles suspended in water, said particles being substantially freer of over-sized particles (which lead to later instability) than if the cream had not been removed.

More particularly, the invention comprises a process wherein the emulsion initially formed is preferably subjected to a relatively quiescent holding stage (as in a tank) a minor fraction in the order of about 0.5–10% of the total flow, being removed from the top area of the holding vessel, said minor proportion constituting the relatively larger particle size emulsion fraction referred to hereinafter as "cream." Thereafter, the remaining major portion of de-creamed emulsion is treated to remove the elastomer solvent therefrom. The figure forming a part of this specification illustrates a preferred embodiment of this invention.

*The polymer*

The process of this invention is applied to cement formed from any hydrocarbon elastomer, preferably a synthetic elastomer prepared from a conjugated diene. It is immaterial how the cement of the elastomer is obtained. Preferably, the elastomer is dissolved in a solvent which has no more than a low solubility in water. While solvents having boiling points in excess of that of water may be utilized, it is preferred that solvents have boiling points below about 70° C. so as to facilitate their removal from the emulsion. Still more preferably, they are also characterized in having a water-solubility of about 0.5–5 cc. per liter of water at 20° C. In the preferred embodiment, the process of the invention is applied to synthetic hydrocarbon elastomers prepared by solution polymerization method wherein the above described organic solvent is used as a combined polymerization medium and rubber cement solvent.

Butadiene and isoprene are representative of conjugated dienes which are polymerized by solution polymerization, utilizing the so called "low pressure" polymerization methods which are known in the art. Lithium alkyls are the typical catalyst utilized for this type of polymerization. Other suitable synthetic polymers for use in the present process are prepared from ethylene and one or more monoolefins having up to about eight carbon atoms per molecule as well as terpolymers having a minor proportion of a diene, e.g., dicyclopentadiene, for the purpose of providing unsaturation in the polymer chain to enable later vulcanization. Suitable copolymers include especially the copolymers of ethylene and propylene which may be either elastomeric or plastic, depending particularly upon the relative proportions of ethylene to higher monoolefin.

The usual solvents employed for polymerizations of this character include especially hydrocarbons having from four to five carbon atoms each including especially butanes, pentanes, butylenes and amylenes as well as higher hydrocarbons having high solvency for the particular elastomers concerned, including benzene, toluene and other relatively inactive diluents and solvents known in the art as well as their mixtures.

The synthetic elastomers with which the present invention is concerned are of relatively recent origin. Their solutions (cements) are characterized by being very high in viscosity even at relatively low elastomeric polymer contents. Thus, the solids content of the elastomer solutions rarely exceeds 30% by weight and in fact at such concentrations serious material handling problems are presented so that the solutions usually contain in the order of 5–20% by weight of the elastomer.

Of course, elastomers that are in solid form may be dissolved or redissolved after preparation by other means.

When used within this specification, the term "synthetic elastomer" makes reference to synthetic elastomers defined according to ASTM Special Technical Publication No. 184, page 138.

The emulsification

The emulsification of the elastomer cement comprises bringing together water, an emulsifying agent, and the cement. The apparatus which is employed for emulsification should be designed for the purpose of homogenizing such mixtures for the production of emulsion. In this stage, a centrifugal pump with a variable speed control, preferably including a bypass line, is found to be suitable although other homogenizing equipment may be employed for this purpose.

The maximum throughput rate in a given piece of apparatus may be substantially increased if the concentration of the polymer in the organic solvent is restricted so as to utilize an optimum viscosity which will vary, depending upon the particular apparatus and polymer employed. The viscosity is not only dependent upon the concentration of the polymer in its cement but also upon the intrinsic viscosity of the polymer per se. For example, cis 1,4-polyisoprene solution in an aliphatic diluent such as isopentane or isoamylene may be employed in concentrations of 10–20%, although much faster throughput rates may be experienced if the concentration is maintained in the order of 7–10%, the intrinsic viscosity of the polymer contained in the cement being between about 4 and 14 dl./g.

The proportion and identity of emulsifying agent or agents will be within the skill of the art, the later stages and eventual utilization of the latex being kept in view. For example, while a reasonably high degree of dispersion is desirable, the economics of the emulsion ingredients, their eventual effect upon the latices later produced and the eventual range of particle size of the latex are all effected by the proportion and identity of emulsifying agent. Too coarse an emulsion produces poor elastomer foam and too fine an emulsion has other disadvantages such as during the concentration of a latex by centrifugation.

The proportion will vary depending upon the emulsification apparatus, the identity of the emulsifying agent, the concentration of the elastomer in its cement, and other variables, including temperature. It should be emphasized that the proportion of emulsifying agent utilized at this point of the process is not necessarily the concentration of emulsifying agent which will remain in the latex eventually produced. Generally, the amount of emulsifying agent needed for emulsification ranges from about two to thirty parts per 100 parts by weight of elastomer (phr.), but the amount that is contained in the most preferred concentrated latex is usually lower than thirty parts and will vary depending upon the particular elastomeric latex that is being prepared. Amounts from about 1 to about 3 phr. usually are optimum.

Any of the emulsifying agents employed in the emulsion polymerization art may be suitably employed for the purposes of the present invention. Preferably, the emulsifying agents are soaps and particularly alkali metal soaps of monocarboxylic acids. The sodium or potassium soaps of rosin acids are especially preferred, although mixed soaps such as the soaps of tall oil acids, saturated or unsaturated fatty acids including oleic, palmitic, stearic, lauric, myristic, castor oil acids and the like may be employed as emulsifiers.

In addition to, or in place of the soap type emulsifying agents, other emulsifiers may be employed, including cationic or non-ionic water dispersible emulsifiers, particularly the amine salts of hydroxyl amines and long chain fatty acid esters, as well as quaternary ammonium salts such as stearyl dimethyl benzyl ammonium chloride and the like. Non-ionic surfactants may be employed which included phosphoric acid esters of higher alcohols such as capryl and octyl alcohol, monoesters of oleic acid with pentaerythritol, sorbitan monoleate and similar species.

The emulsifying agent is preferably added to the mixture being prepared for emulsification in the form of an aqueous solution or dispersion and desirably is in concentrations in the order of 0.5–2% by weight based on the eventual aqueous phase of the emulsion. The amount of water contained in the total composition for emulsification will normally vary from about 40 to about 300 parts per 100 parts by volume of elastomer cement, with amounts in the order of 50–100 parts being preferred.

The emulsification procedures may be varied within the knowledge of the art. Thus, the emulsifying agent may be prepared in situ by adding the soap-forming acid to the elastomer solution and adding an alkali metal hydroxide to the aqueous phase. The reaction of the alkali metal hydroxide and soap-forming acid occurs during emulsification. If desired, all of the ingredients that are to be emulsified may be charged to a single vessel under constant agitation and the blend may then be continuously fed to an emulsifying apparatus. Alternatively, water, solution of emulsifying agent and elastomer solution (cement) may be fed by separate inlets into the emulsifying apparatus in desired proportions and the resulting aqueous emulsion recovered and treated by the subsequent steps.

The proportion of emulsifying agent is adjusted for the purpose of forming a relatively stable emulsion under the conditions and time period required and moreover must be adjusted to the point where transfer of the elastomer from its organic solvent into colloidal suspension in the aqueous phase may be easily accomplished. Emulsions that are not stable are characterized by rapidly settling layers. However, even the generally stable emulsions normally produced by economically feasible emulsifying apparatus contain particles which are too large and therefore tend to separate into a discrete layer, said layer being colloidally unstable. It is the purpose of the present invention to overcome the inherent disadvantages of these oversize particles.

The preferred product from the emulsification step should contain in the order of 3–15% by weight of solids, depending in part upon the amount of water used, the amount in the order of 5–10% being preferred for reasons of overall efficiency, economy and optimum technical properties.

Separation of coarse emulsion fractions

The emulsion formed as described hereinbefore contains a relatively wide range of particle sizes for the production of foams and other end uses. It is highly desirable to control the particle size in the interest of uniformity of end product, namely, latex. The present invention comprises the utilization of means for effecting this control. The "fractionation," for want of a better term, is readily carried out by providing a sufficient time period for the relatively coarse particles to concentrate or separate from the main body of the emulsion. This concentrate of relatively coarse particles can be conveniently called a "cream." By this is meant, in the present instance, a concentration of relatively coarse cement particles emulsified in the aqueous emulsification phase, usually in a concentration of cement to aqueous phase higher than that in the main body of the emulsion.

The amount of residence time in a piece of apparatus, such as a tank, required to cause an effective amount of such separation will vary from one emulsion to another, depending upon temperature the effectiveness of the preceding emulsification step, the difference in specific gravity between the cement and the aqueous phase, the viscosity of the emulsion as governed by the ratio between the continuous aqueous phase and the discrete cement phase, and related factors. Normally, however, the residence time to cause effective creaming will be between about 50 and 300 minutes at the usual operating temperatures.

The amount of cream which is formed by this holding operation also will vary by these same factors and upon the criteria set for particle size distribution of the emulsion which is eventually to be converted to a latex. Under the usual set of operating conditions, however, and when employing a residence time for creaming in the general range specified above, the amount of cream to be separated will usually amount to between about 0.5 and 10% of the total emulsion originally produced. Under the normal circumstances, the specific gravity of the coarse cement particles is less than that of water, and therefore the cream will have an average specific gravity less than that of the main body of emulsion. It will therefore tend to rise to the top of any holding tank and can be removed therefrom for further processing such as recycling to the emulsification zone.

It is to be emphasized that a mere recycling of the entire body of the emulsion to the emulsification zone does not take the place of this holding operation followed by cream separation. Recycling is a normal operation and is desirable to utilize in conjunction with this holding period followed by cream separation.

The separation of the "cream" may be carried out in a continuous or batch manner depending upon the type of operation being utilized. Under the most desired circumstances, the emulsion emerges from the emulsification apparatus into the central section of a holding tank of sufficient size to provide the residence times specified above. The cream is preferably continuously removed from the top portion thereof while the main body of the emulsion, from which the cream has been largely separated, is continuously removed from the bottom portion of the holding tank. It is then sent to a zone where the cement solvent is to be removed for the preparation of a latex.

Solvent removal

Having separated the relatively coarse emulsion particles in the form of a cream, the main body of the emulsion is then treated in such a way as to remove the polymer cement solvent so as to obtain the desired latex. Solvent removal will comprise "weathering," by which is meant relatively quiescent storage periods under conditions whereby the solvent gradually evaporates, flashing operations, distillation, or most preferably, a so-called foaming operation followed by phase separation of the solvent from dilute latex. Flashing and distillation operations are well understood and broadly disclosed in the art.

The preferred process for removal of solvent is based upon the phenomenon of foaming, to which elastomeric cement-containing emulsions are especially subject. The emulsions are especially prone to form excessively stable foams. While means may be devised for suppressing foams, such as the addition of defoaming agents and the like, the use of such agents is often undesirable in view of the subsequent end uses of the latex formed by such means. For example, when foam rubber is to be produced from the latex, the presence of many types of defoaming agents prevent the formation of optimum synthetic rubber foam. Consequently, the preferred process for solvent removal comprises recognition of the foaming aspects of the heated emulsion and means for capitalizing upon this foam formation rather than seeking alternatives to suppress it.

The preferred process comprises heating the emulsion (after cream removal) to such an extent that the cement solvent vaporizes and forms a foam together with the solid and liquid components of the emulsion, condensing the foam so formed by cooling, pressure or a combination of both, and thereafter separating the phases which result. Under the preferred conditions, the phases resulting from condensation of the foam so created comprise a liquid condensed solvent phase and a separate dilute latex phase in which rubber is suspended in the aqueous soap solution. Still further amounts of solvent may be removed from the dilute latex phase by flashing operations or by performing a second "foam-over" operation as just described.

The separate condensed solvent phase may be removed by decantation for further use such as in the formation of additional quantities of rubber cement. It may be desirable to pass the condensed mixture through a coalescer tower so as to cause still further separation of the condensed solvent phase from dilute aqueous latex phase.

Latex concentration

The latex derived as described above comprises a large aqueous emulsifier phase having elastomer particles colloidally dispersed therein. While this dilute latex may be useful for some purposes, it is normally desirable to reduce the proportion of aqueous emulsifier phase. This can be done by evaporative means, a creaming operation, or, preferably, by centrifuging the latex to separate a major proportion of the aqueous emulsifier phase as a "serum" and recover a concentrated latex having a relatively uniform particle size. The solids content of the latex is of material importance for specific uses, but does not form an essential aspect of this invention. Generally, the solids content of the concentrated latex should be in excess of 50% by weight, preferably 55–75% by weight. For cis 1,4-polyisoprene latex, it is most preferred that the solids content be in excess of about 60% and generally between about 65 and 70%.

The process of the present invention will be described with particular reference to the figure: A cis 1,4-polyisoprene cement containing 10% by weight of polyisoprene, the solvent being mixed amylenes, is taken from a source 1 through line 2 to a blend and surge tank 3, wherein it is mixed with an approximately equal amount of water containing 1.5% by weight (basis water) of potassium soaps of rosin acids, from a source 4 by means of line 5. The mixture from the blend tank 3 is then passed by means of line 6 and eductor 7 to an emulsification device 8, which is operated at an exit temperature of about 135° F. The emulsion is recycled by means of lines 9 and 10 to insure maximum dispersal of the cement in the water phase.

Then, in accordance with the particular aspect of this invention, the emulsified mixture is passed to the holding tank 11 wherein it is held for a time period of about 170 minutes, the top 1% of the emulsified material being removed and recycled back into line 10. The proportion so removed constitutes the coarse emulsion particles referred to as "cream." The remaining major proportion of the finished emulsion is then passed by means of line 12 to the heat exchange bundle 13 comprising the foam-forming unit which is operated at about 170–200° F. under 15 p.s.i.g. In this unit, the material which exits comprises a foam of shaving cream consistency which is passed to the time tank 14 for a residence period usually less than about one minute in order to enable the solvent to reach its equilibrium concentration relative to the polymer throughout the foam. The product then proceeds to the foam condenser 15, wherein the foam is chilled to less than about 110° F. at 10 p.s.i.g., thus causing a collapse of the foam due to the condensation of the vaporized solvent to a liquid state. The condensed foam passes by means of line 16 through coalescer 17 which is packed with steel wool for the purpose of further resolving the separate phases of solvent and latex.

The coalesced and condensed material then passes by means of line 18 to a decanter 19 wherein it is stored for a sufficient time at about 110° F. and 10 p.s.i.g. to cause a substantial settling of the phases, the solvent rising to the top and being removed by means of line 20. The lower layer comprising largely a latex with minor proportions of residual solvent, is optionally passed by means of line 21 to centrifuge 22. Any serum, comprising water and emulsifying agent, removed thereby may be recycled by the line shown to the emulsification zone of the process.

The concentrated mixture now contains a minor but substantial amount of residual solvent which is preferably removed by subjecting it to foam formation and collapse as hereinbefore described, in units 23, 24, and 25 comprising the foam former 23, time tank 24 and foam condenser 25 and thereafter passed through a set of apparatus comprising the coalescer 26 and decanter 27. The purposes and results of each of these units are substantially identical with the corresponding pieces of apparatus described hereinbefore.

The bottom layer from the decanter 27, after removal of the top layer solvent, comprises a latex containing a reduced but still substantial amount of solvent which is preferably removed at least in part by passage through a heater 28 to raise the temperature to about 180° F., the heated latex being then sent to a flashing zone 29 for further removal of solvent vapor. The "partially concentrated" latex is now sent by means of line 29A to a centrifuge 30 for still further removal of serum (water and emulsifying agent) which is recycled by means of line 31 to the serum tank 4.

The final product is a concentrated latex containing less than about 1% solvent based on the rubber, the product comprising about 65% colloidally dispersed rubber with 35% water containing about 0.35% by weight of potassium rosinate based on the water phase.

We claim as our invention:

1. The process for the preparation of a latex of an elastomeric polymer of a conjugated diene which comprises:
   (a) forming a cement of said polymer in a $C_{4-7}$ hydrocarbon solvent, said cement containing 5–30% by weight of polymer;
   (b) emulsifying 100 parts by volume of the cement with 40–300 parts by volume of water containing 0.5–2% by weight of an alkali metal soap of a monocarboxylic acid having at least 12 carbon atoms per molecule, whereby a cement-in-water emulsion is formed;
   (c) maintaining the emulsion in a quiescent state for 50–300 minutes, whereby a cream of relatively coarse particles of cement, comprising 0.5–10% of the total emulsion form a phase separate from the main body of the emulsion;
   (d) removing the cream phase;
   (e) heating the remaining emulsion sufficiently to vaporize substantially all of the hydrocarbon solvent while maintaining substantially all the water in a liquid state, whereby a foam of the entire body is formed;
   (f) cooling the foam to a solvent-liquifying temperature whereby the foam collapses and the liquified solvent forms a phase separate from the aqueous phase now containing the polymer in colloidal dispersion as a latex;
   (g) and decanting the liquified solvent from the latex.

2. A process according to claim 1 wherein the elastomer is synthetic polyisoprene.

3. A process according to claim 1 wherein the separated cream fraction is recycled to the emulsification zone.

References Cited by the Examiner

UNITED STATES PATENTS

| | | | |
|---|---|---|---|
| 2,444,801 | 7/1948 | Arundale | 260—29.7 |
| 2,698,303 | 12/1954 | Blair et al. | 252—349 |
| 2,799,662 | 7/1957 | Ernst et al. | 260—29.7 |
| 2,953,556 | 9/1960 | Wolfe et al. | 260—29.7 |

MURRAY TILLMAN, *Primary Examiner.*

LOUISE P. QUAST, *Examiner.*

J. ZIEGLER, *Assistant Examiner.*